T. O'LEARY.
TROUT FLY, HOOK, AND LEADER BOX.
APPLICATION FILED OCT. 21, 1907.
899,466.
Patented Sept. 22, 1908.
2 SHEETS—SHEET 1.
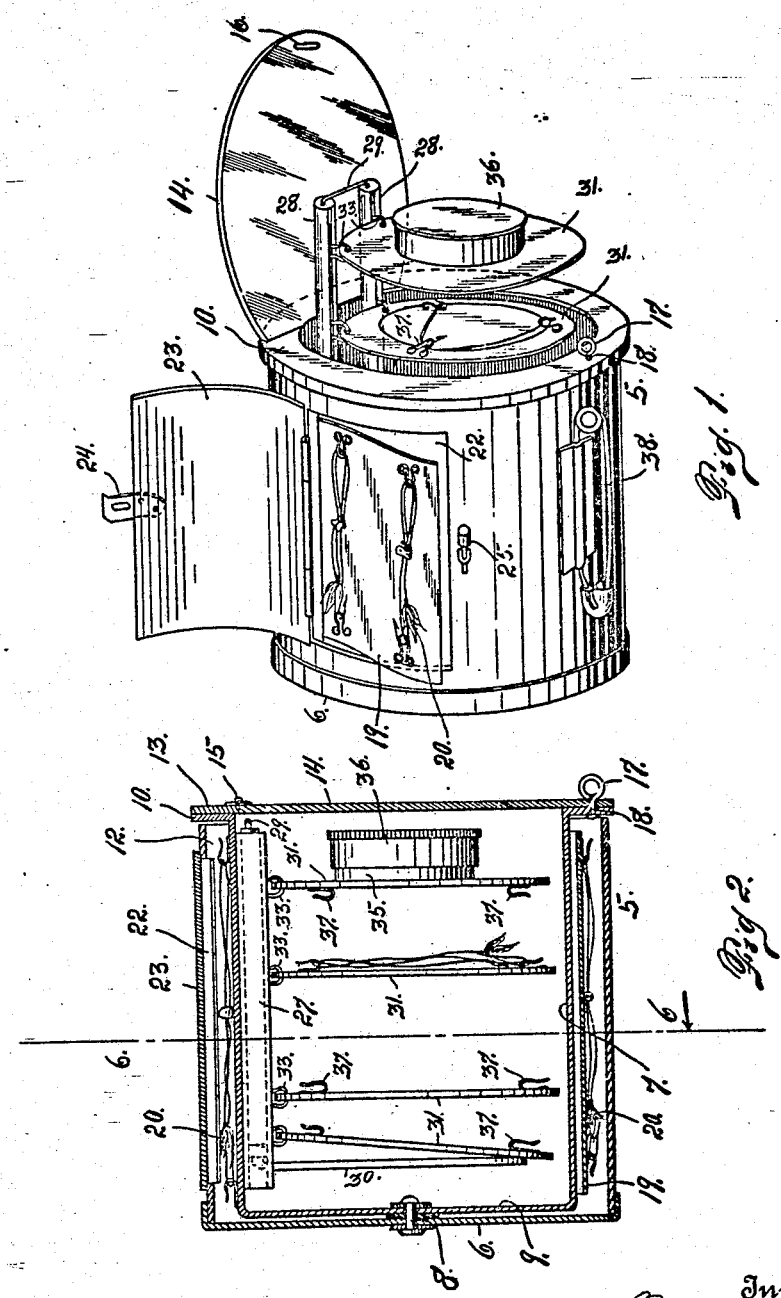
Witnesses
Otto E. Hoddick.
Dena Nelson.
Inventor
T. O'Leary.
By
Attorney

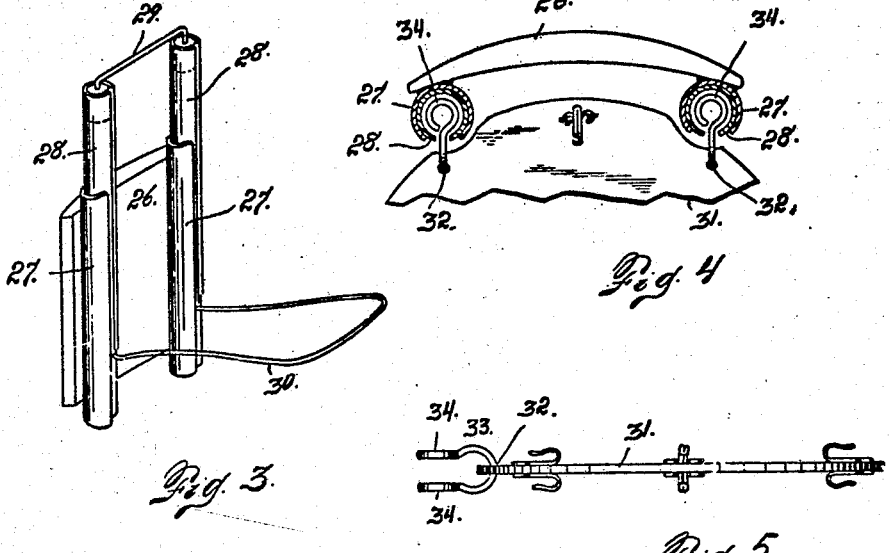
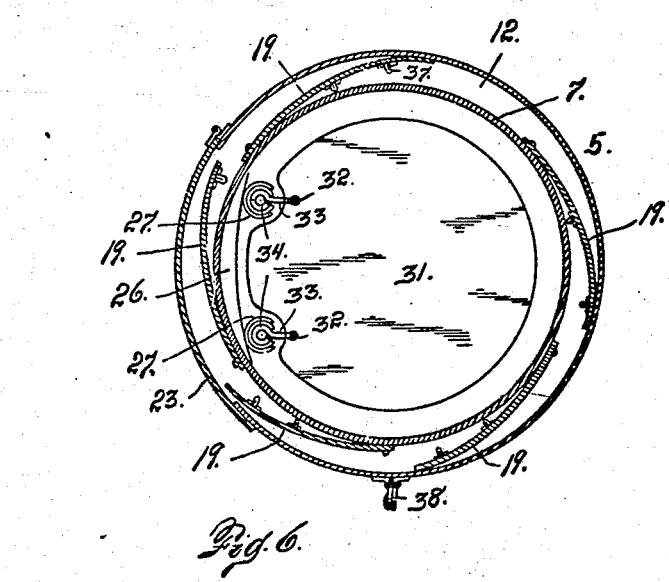

UNITED STATES PATENT OFFICE.

TIMOTHY O'LEARY, OF GUNNISON, COLORADO.

TROUT FLY, HOOK, AND LEADER BOX.

No. 899,466.  Specification of Letters Patent.  Patented Sept. 22, 1908.

Application filed October 21, 1907. Serial No. 398,386.

*To all whom it may concern:*

Be it known that I, TIMOTHY O'LEARY, a citizen of the United States, residing at Gunnison, in the county of Gunnison and State of Colorado, have invented certain new and useful Improvements in Trout Fly, Hook, and Leader Boxes; and I do hereby declare the following to be a full, clear, and exact description of the invention, such as will enable others skilled in the art to which it appertains to make and use the same, reference being had to the accompanying drawings, and to the letters and figures of reference marked thereon, which form a part of this specification.

My invention relates to what I choose to term a trout-fly-hook-and-leader box. The device is provided with an outer casing adapted to be attached by means of a safety pin or other suitable fastening device, to the coat of the user. This casing is provided on what will be its upper side when the device is in position for use, with a lid adapted to be opened whereby access is gained to an inner rotatable cylinder which carries flexible leaves or leaves adapted to be hinged and to which artificial flies may be attached on the inside. Flies may also be attached to the outer wall of the cylinder either underneath the leaves or otherwise as may be desired. As the cylinder is rotated, these leaves are brought into position whereby access is gained thereto through the opening normally closed by the lid of the outer casing. Slidably mounted on the inner wall of the rotatable cylinder is a holder carrying a number of leaves or disks which are mounted to slide upon the holder and also hinged thereon. The leaves or disks mounted upon the slidable holder, are adapted to carry flies, hooks and leaders. To the outer leaf is attached a box adapted to contain small accessories such as sinkers, swivels, rod tips, line guides etc.

The end lid is adapted to be readily opened, whereby access may be gained to the inside of the cylinder where the leaves or disks are located.

Having briefly outlined my improved construction, I will proceed to describe the same in detail reference being made to the accompanying drawing in which is illustrated an embodiment thereof.

In this drawing, Figure 1 is a perspective view of my improved device, showing both the side lid of the cylinder and the top lid of the casing open. Fig. 2 is a longitudinal section taken through the device. Fig. 3 is a perspective view illustrating the slidable holder or carrier for the leaves or disks located within the cylinder. Fig. 4 is a top view of the same showing a fragment of one of the disks or leaves. Fig. 5 is an edge view in detail of one of the disks or leaves. Fig. 6 is a cross section taken through the complete device on the line 6—6 Fig. 2.

The same reference characters indicate the same parts in all the views.

Let the numeral 5 designate a cylindrical casing having one end closed as shown at 6. Within this casing is rotatably mounted, a cylinder 7. As shown in the drawing (see Fig. 2) this cylinder is pivotally connected with the end 6 of the casing as shown at 8. The end 9 of the cylinder adjacent the closed end 6 of the casing is also closed and as shown in the drawing formed integral with the body of the cylinder though the specific construction in this regard is of course immaterial.

The edge of the cylinder opposite the closed end 9 is turned outwardly forming a flange 10 adapted to close the adjacent extremity of the concentric chamber 12 formed between the rotatable cylinder and the casing. The flange 10 is provided with a segmental reinforcement 13 to which is hinged a cover 14 as shown at 15. This cover is slotted at a point remote from the hinge as shown at 16 and adapted to be fastened by means of an eye 17 which is rotatably connected with the flange 10 as shown at 18. This eye protrudes from the flange of the cylinder sufficiently to pass through the slot 16 of the cover 14, after which by giving it a quarter turn, the eye will hold the cover in place. The latter, however, may be readily opened by giving the fastening eye another quarter turn whereby it is in alinement with the slot 16.

To the outer wall of the casing may be attached a number of leaves or pieces 19 of material which may be of a flexible nature as mica or isinglass or composed of any suitable material, adapted to hold flies 20 or hooks. The flies or other devices are attached to the inside of the parts 19. The outer wall of the cylinder may also be equipped with flies 20 (see Fig. 2). The leaves or parts 19 are so arranged that the cylinder may be turned freely within the casing in order to bring the leaves into proper relation with an opening 22 formed in the side of the casing which will be uppermost when the device is in use. This opening is normally closed by a hinged lid 23 having a sort of hasp 24 adapted to engage a fastening device 25 when the lid is in the closed position.

The inner wall of the cylinder is provided on one side with a reinforcement 26 to which are secured two stationary guides 27 open on one side. Within these guides are slidably mounted two members 28 connected together at the top as shown at 29 and provided at the bottom with a sort of yoke 30 which projects into the chamber of the rotatable cylinder. The two members 28 may be termed a slide or slidable holder for a number of disks or leaves 31 adapted to hold flies, hooks and leaders. Each of these disks or leaves 31, is hinged as shown at 32, to a keeper 33 having parallel eyes 34 which enter the tubular members 28 of the slide. By virtue of this construction the leaves or disks 31 not only have a hinged connection with the slide but are also slidable longitudinally thereon. The innermost disk or leaf 31 is supported by the bottom yoke 30 of the slide which yoke is preferably composed of wire; while the outermost disk or leaf 31 carries a box or receptacle 35 having a cover 36 adapted to contain small accessories such as sinkers, swivels, rod tips and line guides.

As shown in the drawing the various disks or leaves 31 are provided with hooks 37 which afford means for attaching the various devices to the said disks. When the cover 14 is open, the slide carrying all of the disks 31, may be moved out of the rotatable cylinder. This may be done for convenience in attaching or removing the various devices with which the disks or leaves 31 are equipped.

From the foregoing description the use and operation of my improved device will be readily understood. Assuming that the device is fastened to the coat of the user by means of the fastening device 38, the lid 23 will be uppermost. Now by grasping the outer edge of the cover 14 together with the flange 18 of the rotatable cylinder, the latter may be rotated at will, whereby the various leaves or parts 19 may be brought into position to be exposed by opening the lid 23. By opening the cover 14, access may be gained to the box 35, as well as all of the disks or leaves 31 which may either be raised without moving the slide bodily outwardly or the slide may be moved out of the open end of the cylinder as desired.

Having thus described my invention, what I claim is:

1. A trout-fly-hook-and-leader box, comprising a casing, a cylinder rotatably mounted within the casing, leaving a concentric chamber between the outer wall of the cylinder and the outer wall of the casing, the said outer wall of the cylinder being equipped to hold fisherman's accessories, the casing being provided with a hinged member adapted to be opened to gain access to the outer wall of the cylinder, and the cylinder being provided with a slidable device having hinged thereto leaves for the purpose set forth.

2. The combination of a casing provided with means for fastening the same to a garment of the user, a normally closed top lid, a cylinder rotatably mounted within the casing and provided with a number of leaves adapted to hold fisherman's accessories, the size of the leaves being such that they will pass through the opening in the casing when the lid is open, substantially as described.

3. The combination with a relatively stationary casing, of a cylinder rotatably mounted therein leaving a concentric chamber between the cylinder and the casing, the outer wall of the cylinder being equipped with means for holding fisherman's accessories, and leaves or parts also attached to the outer wall of the cylinder for the same purpose, the casing being provided with an opening and a hinged lid normally closing the same, the said leaves attached to the outer wall of the cylinder being adapted to pass through the said opening, substantially as described.

4. The combination with a relatively stationary casing, of a cylinder rotatably mounted within the casing leaving a concentric chamber between the two devices, the outer wall of the cylinder being equipped to carry fishermen's accessories, the casing being open and normally closed by a suitable lid, the cylinder being provided with a flange at one extremity adapted to close the adjacent extremity of the said concentric chamber, substantially as described.

5. The combination of a relatively stationary casing, a cylinder rotatably mounted in the casing leaving a concentric chamber between the casing and the cylinder, one extremity of the cylinder having an outwardly bent flange adapted to close the adjacent extremity of the concentric chamber, a cover hinged to the flanged extremity of the rotatable cylinder, and means for fastening the cover in the closed position, substantially as described.

6. The combination with a relatively stationary casing, of a cylinder rotatably mounted therein leaving a concentric chamber between the cylinder and the casing, the cylinder having an opening at one end, the open extremity of the cylinder having an outwardly-extending flange closing the adjacent extremity of the concentric chamber, a lid adapted to close the said opening in the cylinder, the latter having a hinged cover permitting access to the interior of the cylinder, and means applied to the interior of the cylinder for holding the various accessories used by fishermen, substantially as described.

7. The combination of a receptacle having a hinged lid at one extremity, a cylinder rotatably mounted therein, a device slidably mounted within the cylinder and adapted to be moved outwardly through the hinged extremity of the casing, and a number of leaves hinged to the cylinder member and adapted to carry the various accessories used by the fisherman substantially as described.

8. The combination of a receptacle provided with a cover, and a cylinder rotatably mounted therein, the interior of the cylinder being equipped with a number of leaves having a hinged connection therewith and adapted to carry various accessories used by fishermen, substantially as described.

9. The combination of a receptacle having a hinged lid at one extremity, a device slidably mounted within the receptacle and adapted to be moved outwardly through the opening therein, and a number of leaves hinged to the said slide and adapted to carry the various accessories used by fishermen, substantially as described.

In testimony whereof I affix my signature in presence of two witnesses.

TIMOTHY O'LEARY.

Witnesses:
HENRY F. LUKE, Jr.,
JOHN M. ALLEN.